(12) United States Patent
Humphreys et al.

(10) Patent No.: US 7,325,822 B1
(45) Date of Patent: Feb. 5, 2008

(54) TRAILER TANDEM RELEASE HANDLE TOOL

(76) Inventors: Roger Elmo Humphreys, 3815 Bonita View Dr., Bonita, CA (US) 91902; Steven Bruce Humphreys, 5922 Trojan Ave., San Diego, CA (US) 92115

( * ) Notice: Subject to any disclaimer, the term of this patent is extended or adjusted under 35 U.S.C. 154(b) by 378 days.

(21) Appl. No.: 10/984,641

(22) Filed: Nov. 8, 2004

Related U.S. Application Data

(60) Provisional application No. 60/519,038, filed on Nov. 10, 2003.

(51) Int. Cl.
*B62D 53/06* (2006.01)
(52) U.S. Cl. .................................. 280/149.2; 294/19.1
(58) Field of Classification Search ............ 280/149.2, 280/407.1; 294/19.1; 29/278; 219/159
See application file for complete search history.

(56) References Cited

U.S. PATENT DOCUMENTS

| | | | | |
|---|---|---|---|---|
| 3,319,488 A | * | 5/1967 | Bentley et al. | ................ 74/586 |
| 3,843,981 A | * | 10/1974 | Verest | ............................ 7/170 |
| 4,050,107 A | * | 9/1977 | Parma | ............................ 7/100 |
| 4,460,099 A | * | 7/1984 | Empson | ...................... 213/159 |
| 5,065,488 A | | 11/1991 | Chapman | |
| 5,344,201 A | * | 9/1994 | Offin | ............................ 294/24 |
| 5,449,190 A | * | 9/1995 | Ford | ........................ 280/407.1 |
| 5,678,834 A | * | 10/1997 | Wise | ........................ 280/149.2 |
| 6,322,091 B1 | * | 11/2001 | Lindley | .................... 280/149.2 |
| 6,354,642 B1 | * | 3/2002 | Haggerty | .................... 294/19.1 |
| 6,375,162 B1 | | 4/2002 | Johnson | |
| 2003/0122390 A1 | * | 7/2003 | Slauf | ......................... 294/19.1 |

* cited by examiner

Primary Examiner—Eric Culbreth
Assistant Examiner—Karen J. Amores

(57) ABSTRACT

This invention is a multi-functional tool designed to stop injury, save time, and minimize aggravation to truck drivers when sliding trailer tandems and or releasing fifth wheel devices The device can be used as an extension handle facilitating the safe manual pulling of release handles without having to strain when bent at the waist, reducing the chance of serious back injury. When the trailer tandem locking pins are not aligned, our device incorporates a screw jack attached to a spring operating the handle, without the need for brute force. The device holds the locking pin release handle in the released position while the driver moves the trailer axles to the needed position. The invention's use of a mechanical advantage provides greater pulling power than is possible by one person Furthermore, our invention eliminates the need for personnel to be in proximity of moving equipment and at risk of bodily harm or even death. The device prevents damage to the tandem release mechanism by using the spring to buffer the power of the screw jack. Our invention requires no modifications or mounting equipment on most trailers in use today. The folding arm allows for secure attachment to the two types of tandem release mechanisms. It uses the pull hook to attach to the sliding tandem frame for pull type trailers allowing the tool to travel with the axles, holding the handle in the released position For added security our device is the only tool that uses a lanyard choker loop for attachment to a pull type tandem release handle eliminating the possibility of it slipping off and injuring drivers. When folded the arm creates a socket attachment for lift handle type release devices providing an attachment that is quick, simple, and secure. Both types of attachment are positive and can conform to previously damaged or bent release handles The tool is lightweight and folds for convenient storage allowing drivers to keep it with their personal tool kit.

3 Claims, 5 Drawing Sheets

TRAILER TANDEM RELEASE HANDLE TOOL

CROSS-REFERENCE TO RELATED APPLICATION

Figure 1:
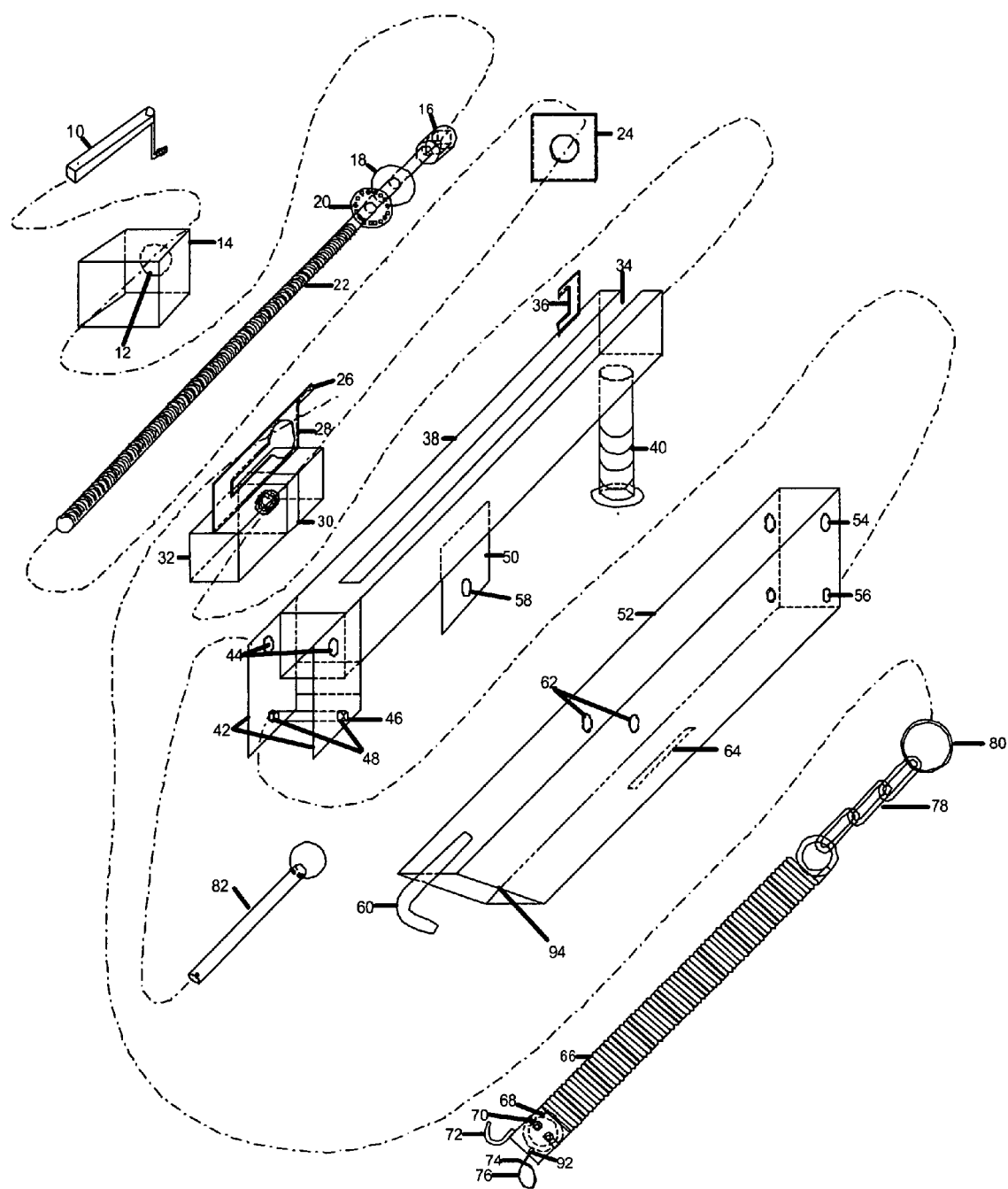

This application is entitled to the benefit of Provisional Patent Application Ser. No. 60/519,038 filed 2003 Nov. 10.

FEDERAL SPONSORED RESEARCH

Not Applicable

SEQUENCE LISTING OR PROGRAM

Not Applicable

BACKGROUND OF INVENTION

1. Field of Invention

This invention is a multi-functional tool to assist truck drivers with the operation of releasing the fifth wheel lock on trucks and tandem locking pins on trailers equipped with movable axles.

2. Background of Invention

The invention described in the following patent application is for use on semi truck and trailer type equipment. The sliding of the trailer tandems adjusts the load balance and it also allows the driver to change the king pin to center of axle length to meet different State's bridge formula and or length laws. Currently to manually pull these release handles one must bend at the waist and reach under the trailer. The possibility of back injury increases when pulling release handles which are positioned under the edge of most trailers. Our device is a multi-functional tool, which can be used as an extension handle for manual pulling of fifth wheel, and tandem release handles without having to bend at the waist. Our invention incorporates a hook on one end with a handgrip handle on the opposing end allowing the driver to manually hook and pull the trailer release handle on a fifth wheel or the release handle on a sliding tandem without bending at the waist. If the tandem slide lock pins on the trailer tandem are lined up with the fixed holes on the trailer body, releasing the locking pins is easily performed manually. The danger of injury occurs if the locking pins on the trailer tandem frame are not aligned with the holes on the fixed track binding the pins in the locked position. When this condition occurs many drivers over strain their back and or shoulders attempting to manually release the sliding tandem locking pins. The described invention incorporates a screw jack and a spring member to preload the locking pins with spring tension when they are bound in the locked position without physical strain. The driver then applies the trailer brakes and uses the power of the truck to rock the trailer back and forth until the pins are aligned allowing the tension of the spring to pull or lift the tandem release handle, releasing the sliding tandem locking pins. Some devices use leverage to apply brute force to the release handle increasing the possibility of damage to the tandem slide lock mechanism and or injury to the driver. With normal wear or overstressing of components the locking mechanism released detent on the release handle may not fully release the locking pins. If the locking pins are not fully retracted they can rub the track between the holes and vibrate the handle off the detent and allow the pins to return to the locked position. Drivers are forced to use many makeshift methods to place the locking pins in a fully released position. Our invention does not rely on the detent on the release rod to hold the locking pins in the fully released position. Our invention extracts and holds the release rod at its maximum travel every time. Attachment of our device, to the tandem frame, uses the manual pull hook on the end of the device. This innovation makes it simple, secure and requires no modification to most trailers. In addition to reducing complexity it also allows the device to conform to the release rod angle, which changes as the rod extract the locking pins. By attaching the device to the sliding tandem frame it holds the locking pins released until the operator is satisfied with the position of the trailer body. The drive then removes the tension on the spring and pins return to the locked position. Another unique feature of our device is the use of a lanyard, also called choker loop, to attach the spring member to the release rod, instead of a metal hook as most other devices use. This attachment also eliminates the need to use the handle as an attachment point. Brute force tools that create excessive force on the handle commonly bend release handles. Other features include attached storage hooks for the spring member, and a crank handle that attaches using a standard 3/8 inch square socket, allowing it to be removed and a battery or air powered drill or impact tool to turn the jack screw. Using a battery or air-powered tool increases the speed and ease of tensioning the spring member, reducing the time required to adjust the sliding tandems. Additionally our device folds for compact storage and as an added utility in the folded position, the extension arm doubles as an attachment socket for lift type tandem release levers.

PREVIOUS ART

U.S. Pat. No. 5,065,488 by Chapman, Richard L and Barb, Lewis E of Kansas. For a Tandem axle-trailer pin extractor device. Filed Mar. 21, 1996, describes a device with a larger outer tube that fits over a smaller inner tube with a spring attached to the larger outer tube. The outer tube also has a slot with notches to allow a fixed pin on the inner tube to move on. The outer tube also has two handles that allow the user to pull the outer tube to tension the spring once it is hooked to the release rod. This device requires a foot that sets on the ground for support of the device when it is being used. The ground is not the best way to support such a device inasmuch as the trailer can be moved, the tire slide and or the brakes may not hold when heavy loads are on the trailer and or trailers are in poor repair. If the trailer moves in relation to the ground the device may be damaged or it may disconnect from trailer/release handle. If it disconnects before it pulls the release rod the driver would be required to start over. The amount of force required to tension the device requires a direct pull, which for some smaller or physically diminished/handicapped persons they may be unable to meet the challenge. Additional in conditions of poor footing the need to pull the handles to tension the spring could cause slip and fall injuries.

U.S. Pat. No. 5,326,144 by Forcier, Clarence D. of Mendota Heights, Minn. For a Semi-trailer sliding tandem pin puller. Filed Jul. 26, 1993, describes a device that requires it to be clamped on to the frame of the sliding tandem. To clamp the device to the sliding tandems requires the driver to bend at the waist and squat down or get on his/her knees under the side of the trailer. This increases the chance of injury to the driver as he/her may injure knees on debris on the ground, especially at night in reduced light areas. Then to regress from under the side of the trailer it is very easy to hit his/her head and or back on the edge of the trailer. Then the device is attached to the sliding tandem handle and the driver is required to pull the handle on the device to tension the pre-load spring. The amount of force required, 80 pounds, to pull the handle to tension the spring is greater then the force required pulling the release handle on the locking pins if the pins are aligned with the fixed holes on the trailer body. Some drivers may not have the strength or weight to pre-load the spring to the needed length to extract the release rod the required length of travel to release the locking pins on the sliding tandems. The described device is designed for use only on the pull rod sliding tandem release handle and is not useable on the lever type release handle. It is not useable as an extension arm to facilitate the manual release of the pull rod type sliding tandem locking pins release handle or the fifth wheel release handle.

U.S. Pat. No. 5,678,834 by Wise, Glenn of Dallas, Tex. For a Tandem positioning assist tool. Filed Mar. 6, 1996, describes a device that requires an attachment lip to be permanently attached to the sliding tandem frame on the semi-trailer. The option is an attachment lip that can be attached with locking pins or other attachment devices and then removed when the adjustment of the sliding tandems is complete. In either case some modification to the trailer is required. When used the driver must assemble a frame to hook onto the removable and or permanently attached lip. While this device is described that it can be used for both types of slide lock release mechanisms, it does require different mounting brackets depending on the type of release handle/lever the semi-trailer is equipped with. In addition the driver must spend extensive time either bent over at the waist or on his/her knees to mount and operate the device. The described device uses a screw to tension a bungee cord to provide the energy to move the release lever. The device is not usable as an extension handle for the manual operation of the slide lock release rod or the fifth wheel handle on a truck-tractor.

U.S. Pat. No. 6,354,642 by Haggerty, Scotty E. of Cuba, Ill. For a puller and locator for trailer tandem axle units. Filed Sep. 6, 2000, describes a spring loading device for assisting the pulling of the rod type slide lock release handle. The device uses two lengths of tubing one larger in diameter then the other. The inner tube is attaches to the sliding tandem using an attachment point mounted on the sliding tandems and has a fixed pin. The outer tube has a slot with notches that allow movement along the fix pin on the inner tube. The outer tube has an attached spring and a handle or hand grip at the further most end. After the inner tube is attached to the sliding tandem frame the handle on the outer tube is pulled to energize the spring. When sufficiently tensioned the handle is turned to lock the outer tube's notched onto the fixed pin on the inner tube. The described device is also described can be used as a manual pull extension handle for both pull type sliding tandem release handles and fifth wheel release handles. This device requires a direct pull to tension the spring and does not provide a means to release the locking pins on the lever lift type handle. The patent describes a tandem position locator included with this device. One part is attached to the sliding tandem handle a second part is attached to the side of the trailer. Then the driver must look in the mirror to align the two markers fifty feet away in a mirror that is jiggling from the vibrations of the truck-tractors engine. In addition the premise is that the driver is not able to tell when the slide lock pins are released. It is very easy to tell when the pins are released inasmuch as the trailer body moves and the trailer tires remain in their original location. No indicator device is required when the locking pins are re-engaged.

U.S. Pat. No. 6,375,162 by Johnson, Darryl Gene of Thornton, Colo. For a trailer tandem release leverage bar. Filed Feb. 17, 2000, describes a device that incorporates a hook on one end and a handle/hand grip on the opposed end. The device also allows the driver to increase the pulling force on the tandem release rod. The device has a hook attached to a chain with the chain attached to the rigid bar with handles on one end and a rubber pad on the other. The addition of force to the tandem release rod does not guarantee the ability to release the locking pins if they are not aligned with the holes on the fixed track. The increased force can actually do damage to the release mechanism linkage. Many release rods are bent out of shape from the use of this type of tool.

OBJECTS AND ADVANTAGES

Accordingly, beside the objects and advantages of the multi-functional tandem locking pin release tool described in my above patent, several objects and advantages of the present invention are:

a. prevent injury to drivers when sliding trailer tandems.

b. reduces the time required to release the locking pins on sliding axle trailers.

c. prevents damage to tandem locking pin release mechanism.

d. quick, simple, and safe attachment without addition equipment and or modifications e. a tool that is compact and easy to store, with all parts securely held in place.

f. a tool that can replace the need of having a second person to release sliding tandems.

g. increases pulling force on release mechanism without need of physical strain.

h. holds release mechanism while drive moves trailer body to needed position.

Further objects and advantages of our invention include a tool that is lightweight, simple to manufacture, rugged and strong giving years of service with minimal maintains required. Rigorous field use has proven our invention to be the fastest, easiest and safest way for a driver to release even the most stubborn tandem locking pins without need of physical strain and or chance of injury.

SUMMARY

In accordance with present invention a multi-functional tool to assist truck drivers with the releasing of sliding tandem locking pins on trailers with movable axles. This invention attaches to the movable tandem axles frame and travels with the axles during the adjustment using a force multiplying device to tension an elastic member as a means of urging the locking pins to the released position.

DRAWINGS—FIGURES

FIG. 1, Disassembled view of invention.

Figure 2:
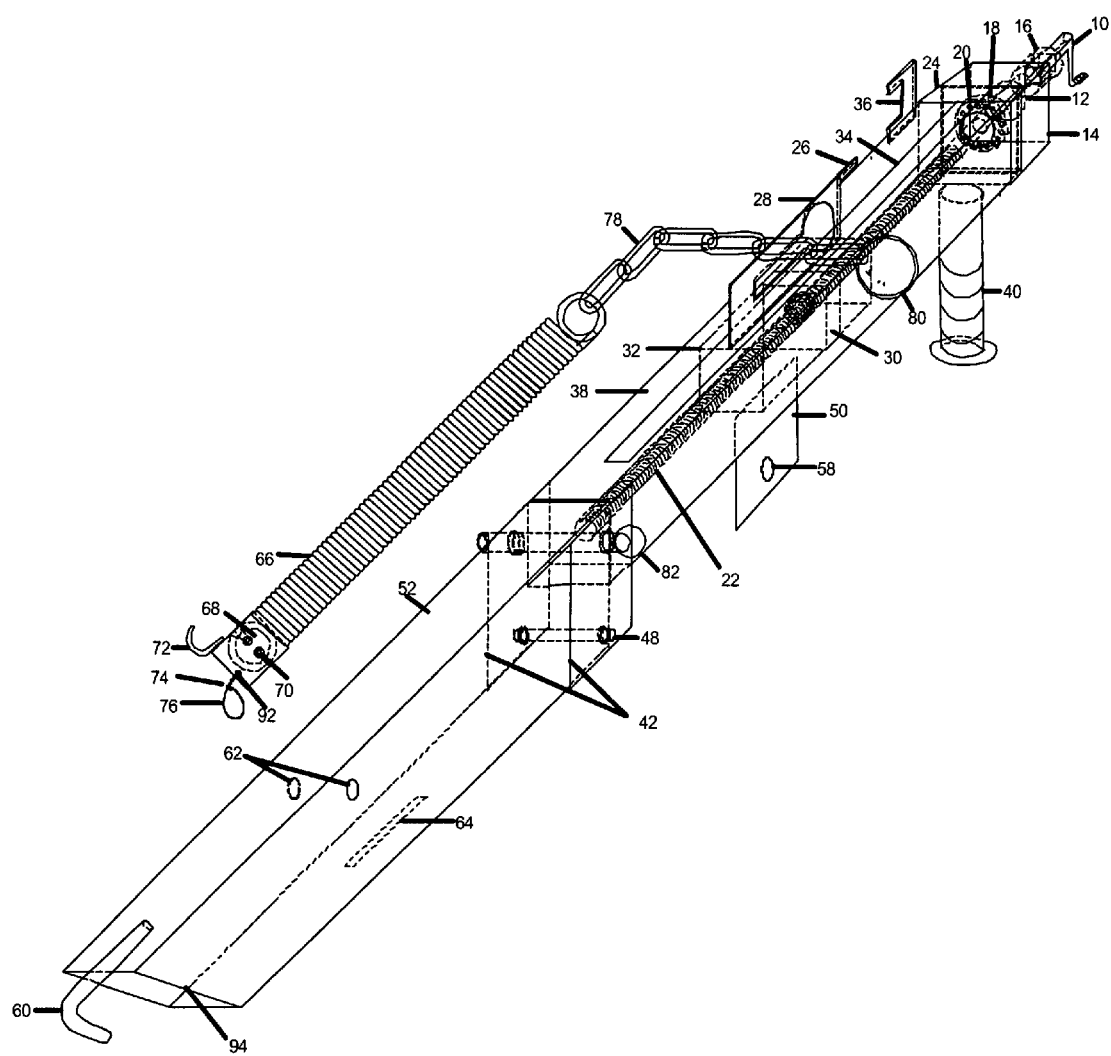

FIG. 2, Invention in extended configuration. In this arrangement it can be used as a manual extension which allow a driver to use the hook 60 and the hand gripe 40 to pull on a fifth wheel or sliding tandem release handle without having to bend at the waist to reach either type of device. Additional this arrangement provides a means of connecting hook 60 to a trailer frame into the hole that the release rod passes through. Then the lanyard 76 is attached to the trailer release rod and with a sight pull the lanyard is locked onto the rod. The slack in the adjustment chain is then removed by pulling the chain end ring 80 to pass adjustment chain 78 through the hole in chain adjustment plate 28. Crank handle 10 is placed into jackscrew socket 16 and turning jack screw 22 clock-wise moves the nut 30 attached to the chain adjustment plate guide 32 attached to chain adjustment plate 28. This turning of the crank pulls tension spring 66.

Figure 3:
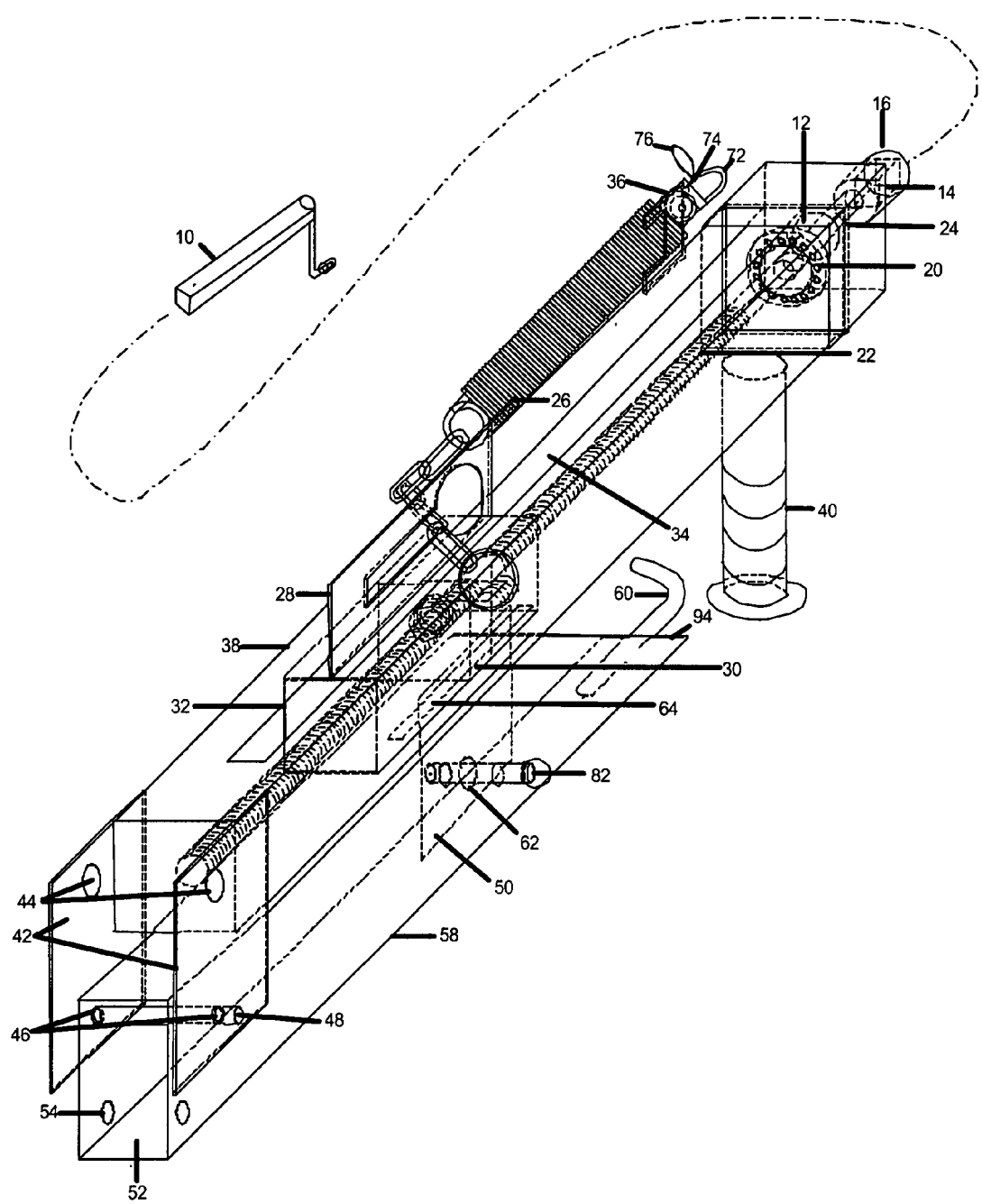

FIG. 3, Invention in folded configuration. In this arrangement the device is compact and facilities storage of extension arm 52 on hinge pin 46 under frame 38 then by inserting hitch pin 82 through hole 62 and hole 58 in storage tab 50 to lock it in place. In addition the tension spring 66 is mounted to frame 38 by fixed spring storage hook 36 and adjustable spring storage hook 26 which is attached to chain adjustment plate 28 making the invention a one piece unit.

Figure 4:
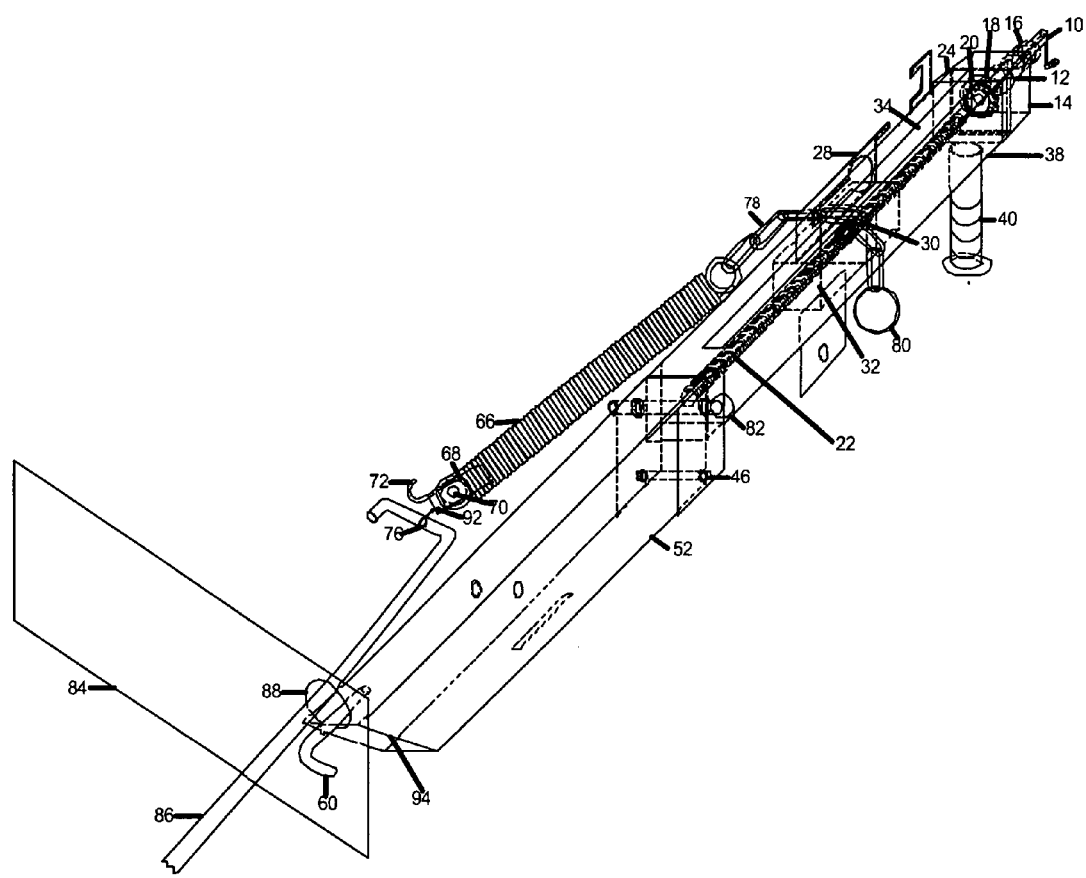

FIG. 4, View of invention in use on a pull type sliding tandem release mechanism. It is attached to the sliding tandem frame 84 by inserting attachment hook 60 on angled 94 end of arm 52 into release rod guide hole 88. The lanyard 76 is looped on sliding tandem release rod 86 with a slight tug it locks itself preventing it from slipping off and injuring the driver. The driver then removes the slack in adjustment chain 78 by pulling on chain end loop 80 and hooking it into slot in chain adjustment plate 28. To generate the pulling power the driver turns crank handle 10 clock-wise turning jack screw 22 in nut 30 motivating chain adjustment plate 28 pulling tension spring 66.

Figure 5:
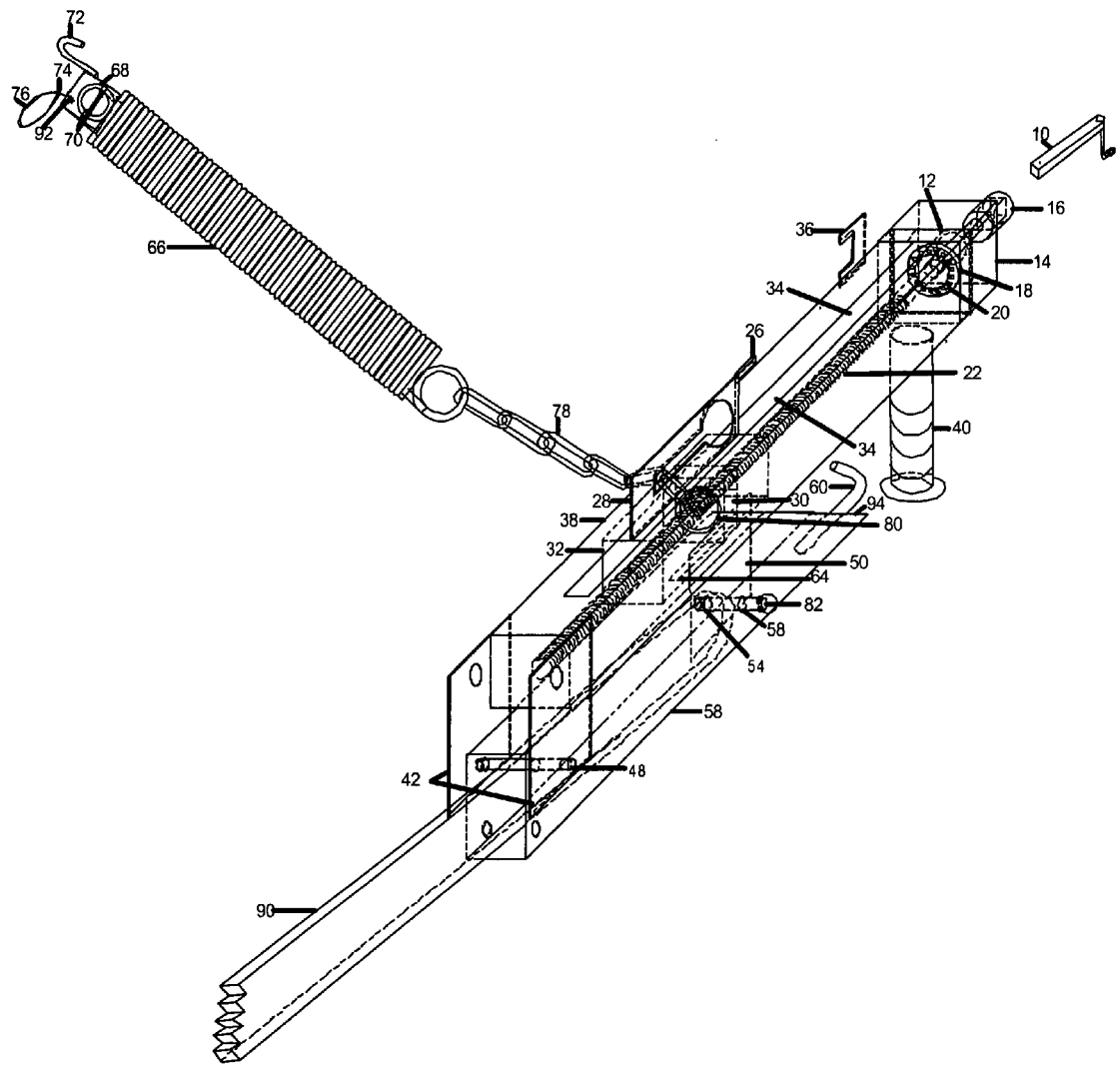

FIG. 5, Shows the invention in the folded configuration which turns extension arm 52 into an attachment socket that fits over lift type tandem release handle 90. The spring attachment hook 72 when hooked to the track guide of other fixture on the sliding tandem axle frame creates a point to provide a lifting action on the lift type tandem release handle 90 when jack screw 20 is rotated in jack screw nut 30 which moves adjustment plate guide 32 to which chain adjustment plate 28 is attached and which length adjustment chain 78 is passed thru and when one link is hooked in the slot portion of chain adjustment plate 28 pulls tensioning spring 66 creating a lifting motion on the release handle and when the tandem locking pins are aligned by rocking the trailer the locking pins are released.

| DRAWINGS - REFERENCE NUMERALS: | |
|---|---|
| 10 | Crank handle |
| 12 | Bearing cap socket access |
| 14 | Bearing cap |
| 16 | Socket |
| 18 | Thrust washer |
| 20 | Thrust bearing |
| 22 | Jackscrew |
| 24 | Bearing plate |
| 26 | Spring storage hook, adjustable |
| 28 | Chain adjustment plate |
| 30 | Jackscrew nut |
| 32 | Adjustment plate guide |
| 34 | Frame slot |
| 36 | Spring storage hook, fixed |
| 38 | Frame |
| 40 | Hand grip |
| 42 | Hinge plate |
| 44 | Hitch pin hole |
| 46 | Hinge pin hole |
| 48 | Hinge pin |
| 50 | Storage tab |
| 52 | Extension arm/Release handle socket |
| 54 | Hitch pin hole |

-continued

| DRAWINGS - REFERENCE NUMERALS: | |
|---|---|
| 56 | Hinge pin hole |
| 58 | Storage tab hitch pin hole |
| 60 | Attachment hook |
| 62 | Hitch pin hole |
| 64 | Extension arm tab slot |
| 66 | Tensioning spring |
| 68 | Spring attachment plate |
| 70 | Spring attachment plate bolt |
| 72 | Spring attachment hook |
| 74 | Lanyard roller |
| 76 | Lanyard |
| 78 | Length adjustment chain |
| 80 | Chain end ring |
| 82 | Hitch pin |
| 84 | Sliding tandem frame rail |
| 86 | Pull type tandem release rod |
| 88 | Release rod guide hole |
| 90 | Lift type tandem release handle |
| 92 | Lanyard attachment bolt |
| 94 | Angle cut on Rigid Tube at Hook End |

DETAILED DESCRIPTION—FIGURES—PREFERRED EMBODIMENT

The crank handle 10 uses the male end of a standard $3/8^{th}$ inch socket extension cut in half. To that a length of small diameter rod bent at a ninety-degree angle then welded to the cut off end pointing away from the socket end. Bearing cap 14 with opening 12 permits the crank handle 10 to fit into the female end of the cut in half $3/8^{th}$ inch socket 16. This female half of the socket 16 is attached to jack screw 22, adjacent a thrust washer 18.

The assembly is inserted thru bearing 20 and bearing plate 24 and into frame 38. Bearing cap 14 is attached to one end of frame 38 and retains the jackscrew 22 thrust washer 18, bearing 20 and bearing plate 24. Frame 38 is a tube with slot 34 cut down the length on one side. On the opposite side of frame 38 from slot 34 and close to the end where bearing cap 14 is attached, at ninety degrees to the length of the frame, a length of tubing or pipe is attached to form hand gripe 40. On the same side of frame 38 as the hand gripe/handle, near the center of the length of frame 38 a storage tab 50 is attached. Tab 50 has hitch pin hole 58 drilled near the end distain from the point of attachment. On the opposed end from the bearing with one on each side of frame 38 two flat hinge plates 42 are attached. The hinge plates 42 are placed flush to the slotted side of frame 38 and over hang the end of frame 38 half their width and length. The hinge plate 42 has two holes drilled in them. The top hole 44 for hitch pin 82, fixes extension arm 52 in the extended position, hinge pin hole 48 and hinge pin 46 attaches arm 52. Attached on the side of frame 38 is fixed spring storage hook 36 which is pointed at hinge 42 end of device. It is positioned as close as feasible to bearing cap 14. A second spring storage hook 26 is part of chain adjustment plate 28. Chain adjustment plate is attached to the adjustment plate guide 32 by welding on the centerline on the outside of two section of square tube with a gap between the two sections. Between the two sections which are slightly smaller then the inside dimension of frame 38 is welded the threaded jackscrew nut 30. When the assembly is threaded onto jackscrew 22 and inserted into frame 38 the chain adjustment plate 28 protrudes from frame 38 though slot 34. Attached by hinge pin 46 and by holes 56 in extension arm 52. Extension arm 52 is a length of rectangle material, the narrow aspect of arm 52 is the same dimension as the square tube frame 38 facilitating the alignment of hinge plates 42. Extension arm 52 is a multi-functional trailer release mechanism attachment member. It is cut square on the hinged end and at a forty-five degree angle 94 on the long aspect making one of the narrow aspects longer then the other. Attached on the longer side, positioned in the center with the end pointed toward the shorter side is attachment hook 60. When extension arm 52 is in the extended condition and locked in place by hitch pin 82 inserted though hole 54 in extension arm 52 and corresponding hitch pin hole 44 in hinge plate 42, attachment hook 60 is ready to be used as a release handle attachment device. On the bottom of extension arm 52 is a slot positioned in the middle running a sufficient length to allow the insertion of storage tab 50. When folding arm 52 is positioned under frame 38 by folding it on hinge pin 46 and inserting hitch pin 82 though hole 58 the extension arm function as the release handle socket. One end of adjustment chain 78 attaches to an end loop of tension spring 66 that is then threaded though chain adjustment plate 28 on the opposite end of adjustment chain 78 end ring 80 is attached. End ring 80 is larger in diameter then the hole and slot in chain adjustment plate 28. On the opposite end of tension spring 66 a spring attachment plate 68 is attached to the end loop by two spring plate bolts 70. Welded to one side of spring attachment plate 68 is spring attachment hook 72 is point away from lanyard 76. Lanyard 76 is made of $\frac{1}{16}^{th}$ inch multi-stand stainless-steel aircraft control cable approximately eighteen inches in length, folded in half and roller 74 is placed at that point. The roller is held in place by a double loop connector crimped onto the cables maintaining the fold. The folded cable is then loop through itself between the lanyard roller 74 and the double loop crimped connector to create a choker loop, resembling a choker loop used by log skidders to pull cut logs. When attached to a release rod the harder it is pulled the tighter it grips on the rod. The ends of the cable are then passed thru a hole in lanyard attachment bolt 92. Lanyard 76 is crimped and retained by nut to spring attachment plate 68.

Operation

To release the trailer from the truck-tractor or manually pull a release rod on pull type sliding tandem mechanisms, the driver removes hitch pin 82 from hole 62 in extension arm 52 and hole 58 in tab 50 which hold the extension arm 52 in the folded position. He then rotates extension arm 52 on hinge pin 48 to the extended position and then inserts hitch pin 82 into holes 44 on hinge plates 42 and hole 54 in extension arm 52. Holding the device by frame 38 and hand gripe 40 the driver attaches the tool to the fifth wheel or sliding tandem release handle using hook 60. The length of the tool allows the driver to pull the release handle without having to bend and the waist to reach under the edge of the trailer.

If the driver needs to adjust the trailer's sliding tandem and is unable manually pull the release rod due to a condition where the locking pins are in a bind with the holes in the track that is affixed to the body of the trailer. The driver already has the device in the extended condition he or she only needs to place hook 60 into the tandem release rod hole 88. The driver inserts crank handle 10 into socket 16 and by turning it counter-clockwise operates jackscrew 22 moving jackscrew nut 30 away from the bearing cap 14 end of frame 38. Jackscrew nut 30 attached to the assembly made up of chain adjustment guide 32 and chain adjustment plate 28 and spring storage hook 26 move to the released position. Spring storage hook 26 which is inserted into one end of tensioning spring 66 the opposed end of tensioning spring 66 is inserted in a fixed spring storage hook 36 that is attached to frame 38. The moving of chain adjustment plate and associated parts release tension spring 66 from the storage position. The driver then holds tension spring with one hand, using it as an extension, slips lanyard 76 around pull type tandem release rod 86 and down the rod as far as possible. By pulling on tension spring 66 lanyard 76 is set on rod 86 and with not slip off. He or She then uses chain end ring 80 to thread length adjust chain 78 though the hole in chain adjustment plate 28 to remove all the slack and then hook one loop of chain 78 into the slot on plate 28. By turning crank handle 10 clock-wise rotating jackscrew 22 jackscrew nut 30 and attached assembly that includes chain adjustment plate 28 moves toward the crank end of frame 38. This movement of chain adjustment plate 28 and associated assembly energizes tension spring 66 creating a pulling force on rod 86. When the driver sets the trailer brake and alternates put the truck into forward or reverse gear then eases out the clutch, it moves the body of the trailer and the attached track getting the holes in the attached track to align with the locking pins on the tandem axle frame. When the holes align with the locking pins tensioning spring 66 pulls rod 86 and releases the sliding tandems from the trailer body. The driver can then push or pull the body to the need position in relation to the axles. When in the needed position he or she returns to the invention and turns crank handle 10 counter-clockwise releasing the pull on tension spring 66 and with one hand on tension spring 66 can release the lock on lanyard 76 and slip it off rod 86. A reversal of the first steps will return spring 66 to the storage hooks 26 and 36 and extension arm 52 to the folded for storage position. If the trailer has a lift type tandem release handle 90 the driver leaves the device in the folded position with extension arm 52 held by hitch pin 82 though hole 62 and hole 58. The drive slips the open end of extension arm 52 over release handle 90 and release tension spring 66 from storage hooks 26 and 36 as before. Using tension spring 66 as an extension handle he or she attaches spring attachment hook 72 to any part of the sliding tandem frame that is at a point higher then the upper movement of the release handle 90. He or She then turns crank handle 10, as before, to create a pulling force on tension spring 66. Again using the truck to rock the trailer body and align the locking pins in relation to the holes on the fixed track, when they are aligned tension spring 66 lifts handle 90 and releases the locking pins.

Advantages

A semi-trailer is a trailer with one or more axles and a kingpin to attach it to a truck-tractor fifth wheel that carries a portion of the load. The weight of the vehicle and load cannot exceed 34,000 pounds on a two-axle tandem wheel position, when operated on the Interstate Highway System. A saying that covers the variety of products carried on trucks is, "if you bought it, a truck brought it". Some items are light and bulky and fill a trailer completely before reaching the maximum weight limit, other products are heavy and maximum weight is achieved long before the trailer is filled. The increased trailer size limits on Interstate Highway System and the differences in density spurred the trailer manufactures to build trailer with rear tandems that can be adjusted in the field by the driver, without having to disassemble the trailer to make these changes. In addition, some states have different kingpin to center of rear axle length requirements. The standard of the trailer industry is a set of tracks attached to the body of the trailer, with two or four retractable locking pins on the tandem axle frame controlled by a single lever or pull rod. This allows the driver to retract all the pins at one time releasing the tandem axles from the body of the trailer. When the adjustment is completed the driver only needs to release the lever or rod at which time the return spring on the release handle urges the pins to the locked position. Adjusting of sliding tandems is time consuming and can cause injuries if the locking pins are not aligned with the fixed holes on the trailer body. The driver must exit the truck cab, walk to the rear of the trailer and attempt to pull the rod release handle or lift the release lever depending on the manufacture of the trailer, both of these release devices require the driver to pull or lift while bending at the waist, inasmuch as the release device is under the body of the trailer. Many back and shoulder injuries have occurred because of the position and of the tandem release handle. If the attempt to release the pins is unsuccessful the driver must return to the cab of the truck and use the power of the truck-tractor to rock the trailer and try to center the locking pins with the holes in fixed track attached to the trailer body. The driver must then exit the cab and walk to the rear of the trailer to repeat the attempt to pull or lift the release handle. If the driver can get another person to assist in the process it can greatly reduced the time and effort required to perform the sliding of the trailer tandems, but in many locations the driver may be alone, at a remote trailer drop lot. Using our invention the driver would walk to the sliding tandems with the invention. He or She would attach the device to the tandem release pull rod handle using the hook end on the invention. Taking a normal stance with feet apart and back straight, grip the device by the handgrip and pull. If the pins on the sliding tandems are aligned with the fixed holes on the trailer body, the release rod can be pulled to the detent on the release rod holding the locking pins in the released position. The driver then returns to the cab of the truck-tractor and using the power of the vehicle push or pull the trailer body to the proper position over the axles. If the locking pins on sliding tandems are not aligned with the fixed holes on the body of the trailer the pins cannot be pulled manually. The driver would then insert the same pull hook, on the end of the invention, into the hole that the tandem release rod passes through. Our unique angled end of extension arm allows our invention to align itself with the pull handle even if tandem release rod is not straight, while the hook keep the invention from rising to hit the under side of the trailer body. When the driver inserts the attachment hook into the release rod hole it lifts the tandem release rod out of its detent notch at the bottom of the hole keeping the release rod in the unlocked position. The next step is to use the spring as an extension handle to attach the lanyard to the release rod and then remove the slack from the adjustment chain. When pulled by the jackscrew the lanyard locks onto the release rod keeping it from slipping off and injuring the driver. The driver then tensions the spring by turning the screw with the removable crank handle or by inserting a battery or air powered drill or impact wrench into the jackscrew socket. An additional safety feature of the device is that when turning the crank to tension the spring the driver holds onto the hand gripe reducing the chance of slipping on icy and or slick surfaces. The driver then returns to the cab of the truck-tractor and uses the power of the truck-tractor to push or pull on the body of the trailer until the pins align and the spring pulls the rod releasing the locking pins. The sliding tandems are then released and the body of the trailer is movable to the desired position. Once the body of the trailer is in the proper position the driver exits the truck-tractor cab walks back to the sliding tandem verifies that it is required position. The driver then turns the jackscrew releasing the tension on the spring member that releases the lock of the lanyard on the release rod. The lanyard can then be removed from the release rod using the spring as an extension handle. The next step is to unhook the device from the sliding tandem's release rod hole. The release rod will then return to its locked position urged by a return spring on the trailer slider mechanism. A second type of sliding tandem release device is the lift lever release mechanism. The operation is similar to the pull release rod except that the driver must bend at the waist to reach the lever that is below the body of the trailer, just inches from the ground. Then lift the handle to disengage the locking pins from the fixed track on the trailer body. If the pins are not aligned the rocking of the trailer is required to align the pins to allow them to release. Using our invention the driver slides the square tube sockets end of the folding arm of our invention over the lift handle to the stop. The driver then attaches the hook on the spring member to a fixed point on the sliding tandem frame. The driver tensions the spring using the screw jack, returns to the cab of the truck-tractor and moves the trailer body until the pins align with the fixed holes on the track while the device lifts the handle releasing the locking pins. The use of our invention eliminates back and shoulder strains and sprains a significant advancement in reducing a majority of injuries that occur to drivers. There have been cases of deaths occurring during the sliding of trailer tandems. Case in point a husband and wife team of drivers had arrived at a customer that required the sliding tandems to be moved to the rear most position before it could be unloaded at the dock. The husband had made numerous attempts to release the locking pins by rocking the trailer to align the pins. He decided that the only way to get them released was to hit them with a hammer while his partner/wife rocked the trailer using the power of the truck-tractor. He proceeded under the trailer with his hammer and began hitting the locking pins. When the last pin released he was between the wheels of the trailer and the bumper of the trailer. The partner/wife had the truck-tractor in a forward gear and the body of the trailer shot forward crushing her husband between the trailer wheels and the rear bumper of the trailer. The use of our invention could have saved this driver's life. Our invention is truly unique from previous art in the fact it does not require additional frames and or modifications to trailer frames to create the leverage point required to motivate the release rod or lever. The described invention is the only device that can to be used on both types of release mechanisms, without the need of additional mounting device. It does not need to be attached to the trailer body, which limits the amount of movement that can be made before it damages the elastic member, destroying the device. Our invention is hooked into the release rod hole on the sliding tandem frame or slips onto the release lever and travels with the trailer tandem frame eliminating chance of damage to the device. Our invention does not use brute force in an attempt to release the locking pins, preventing damage to release mechanisms. Tandem locking pins are smaller then the fixed holes of the slider track that with age wear becoming deformed. These deformities can act like hooks on the end of the pin keeping them from passing though the holes in the fixed track on the trailer body until they are perfectly centered. The addition of brute force using a leverage device bends and or breaks components of the trailer slide lock mechanism requiring repair or replacement. Our devices pulling force is limited to the pulling power of the spring. This invention is truly unique in the field by incorporating a jackscrew-tensioning device eliminating the need for great muscle strength to pull a pre-loading spring that for small and or female drivers can be difficult or impossible.

CONCLUSION, RAMIFICATION, AND SCOPE

Accordingly, the reader will see our invention is truly unique from previous art in the fact that it does not require additional frames and or modifications to trailer frames to create leverage points required to motivate the release rod or lever. The described invention is the only device designed to be used on both types of release mechanisms, without the need of additional mounting devices. Our invention does not attach to the trailer body, limiting the amount of movement that can be made before it damages the elastic member destroying the device. Our device is hooked into the release rod hole on the sliding tandem frame or it slips onto the release lever and travels with the trailer tandem axle frame eliminating chance of damage to our device. Our invention dose not use brute force in an attempt to release the locking pins, preventing damage to release mechanisms. Tandem locking pins are smaller then the fixed holes of the slider track which with age they become deformed. These deformities can act like looks on the ends of the pins keeping them from passing though the holes in the fixed track on the trailer body until they are perfectly centered. The addition of brute force by using a leverage device bends and breaks components of the trailer slide lock mechanism requiring repair or replacement. Our device's force is limited to the pulling power of the spring. This invention is truly unique in the field incorporating a jackscrew tensioning device eliminating the need for great physical strength to pull a pre-loading spring that for small and or female drivers can be difficult to impossible. The pulling of the spring becomes a safety issue in slick or icy conditions.

Although the description above contains many specificities, these should not be construed as limiting the scope of the invention but merely providing illustrations of some of the presently preferred embodiments of this invention. For example the device could be made in a non-folding design is the user only had one type of release handles in their fleet. A nylon strap with a one-way catch is a possible replacement for the length adjustment chain and chain adjuster plate. The jackscrew handle could be made so that it adjusts in length, allowing an easy change in the force and speed of turning the jackscrew and operating the device. A battery or air powered reversible drive motor could replace the manual crank turning the jack screw and operating the device, etc.

Thus the scope of the invention should be determined by the appended claims and their legal equivalents, rather than by the examples given.

We claim:

1. A tool for manually operating release handles on a semi-truck trailer equipment using a screw device incorporated into a rigid tube with a hand-grip, an operating crank on the first end of said rigid tube, and an angle cut with a fixed hook on the second end,
   said hook as a means for attaching said rigid tube into a sliding tandem release rod guide hole in a trailer tandem frame while said angle cut on said rigid tube allows said rigid tube to move up or down in relation to the movement of the tandem release rod when said rigid tube is attached by said fixed hook into said trailer release rod guide hole;
   said screw device tensions an elastic member attached to said screw device with an attached binding lock chocker loop as a means of attaching to a sliding tandem release rod, creates a pulling force on the release handle as a means of releasing the sliding tandem locking pins.

2. A tool as described in claim 1, wherein the rigid tube is hinged to allow said rigid tube to be folded for storage.

3. A tool as described in claim 1, wherein the operating crank is removable for storage.

* * * * *